United States Patent [19]
Takimoto

[11] 3,939,031
[45] Feb. 17, 1976

[54] DEVICE FOR BUTT SPLICING WEBS

[75] Inventor: Hisashi Takimoto, Minami-ashigara, Japan

[73] Assignee: Fuji Photo Film Co., Ltd., Nakanuma Ashigara, Japan

[22] Filed: Nov. 29, 1974

[21] Appl. No.: 528,310

[30] Foreign Application Priority Data
Nov. 29, 1973 Japan............................. 48-134581

[52] U.S. Cl. ............... 156/505; 156/304; 156/510; 242/58.3; 242/58.4
[51] Int. Cl.² .......................................... B31F 5/06
[58] Field of Search .......... 156/304, 503, 504, 505, 156/510; 242/58.3, 58.4

[56] References Cited
UNITED STATES PATENTS

| | | | |
|---|---|---|---|
| 3,654,035 | 4/1972 | Takimoto............................ | 156/504 |
| 3,717,057 | 2/1973 | Takimoto............................ | 156/505 |

*Primary Examiner*—William A. Powell
*Assistant Examiner*—Brian J. Leitten
*Attorney, Agent, or Firm*—Sughrue, Rothwell, Mion, Zinn & Macpeak

[57] ABSTRACT

A device for butt splicing a succeeding web to a preceding web comprising a rotatable cutting drum provided with a cutting member, a rotatable cutting and splicing drum provided with a cutting member and means for holding the leading end of the succeeding web after cutting, and a rotatable splicing drum provided with means for holding a piece of a splicing tape, characterized in that rotation of the drums causes the cutting drum and the cutting and splicing drum to cut at least the preceding web of the succeeding and preceding webs, and the leading end of the succeeding web after cutting, while being held by the cutting and splicing drum, is fed into a splicing zone, whereby the cutting and splicing drum cooperates with the splicing drum to butt splice the succeeding web on the preceding web by applying the splicing tape thereto.

2 Claims, 8 Drawing Figures 3,939,031

DEVICE FOR BUTT SPLICING WEBS

BACKGROUND OF THE INVENTION

1. Field of the Invention

This invention relates to butt splicing devices for splicing flexible web-like materials (hereinafter referred to as "web") such as plastics, paper, metal foils, etc., and more particularly to a device which is capable of butt splicing extremely thin webs while they are travelling.

2. Description of the Prior Art

A known prior art device for butt splicing thin webs is disclosed in U.S. Pat. No. 3,654,035 as illustrated in FIG. 8. In this device, a cutting drum 7 and a cutting and splicing drum 8 are provided to cut a succeeding web 3 whose unwinding is begun and a preceding web 2 whose unwinding has already been completed, both webs being overlapped, and the cutting and splicing drum 8 and a splicing drum 9 are provided to splice the leading end of the succeeding web 3 to the trailing end of the preceding web 3 with use of a splicing tape 23. In this case, however, the leading end of the succeeding web 3 after being cut is not held by the drum until it has been spliced, and for the purpose of splicing the leading end of the succeeding web 3 after cutting has to be transported by means of the cutting drum 7 to a splicing zone A separated a distance therefrom along a transporting guide 15. However, where the thickness of web is extremely thin, for example, less than 25 μ, the web has a low rigidity and lacks firmness so that it is often difficult to transport the leading end of the succeeding web 3 into the splicing zone A. Even if the leading end of the succeeding web 3 should be transported into the splicing zone A, it would be extremely difficult to intimately contact the leading end of the succeeding web 3 and the trailing end of the preceding web 2, thereby often producing a joint having a separation therebetween and allowing adhesive on the splicing tape 23 to be exposed, thus obtaining a poor joint. Particularly, when splicing is performed at a high speed, these problems become remarkable, which results in a significant difficulty in that it is extremely hard to achieve high speed splicing.

SUMMARY OF THE INVENTION

The present invention eliminates the disadvantages noted above with respect to prior art devices and has as an object the provision of a device which can butt splice webs at high speed.

Another object of the present invention is to provide a device which can butt splice extremely thin webs.

These objects of the present invention are accomplished by splicing the leading end of a succeeding web after cutting, while being held by a drum which has cut the succeeding web, to the trailing end of a preceding web in cooperation with a splicing drum.

The invention will become apparent from the following description taken in connection with the accompanying drawings.

BRIEF DESCRIPTION OF THE ACCOMPANYING DRAWINGS

DESCRIPTION OF THE PREFERRED EMBODIMENTS

Figure 1:
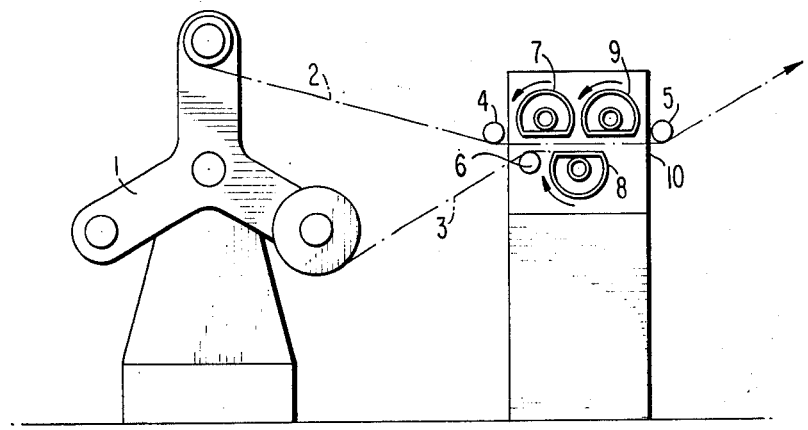
FIG. 1 is a schematic section showing an embodiment including a conventional three-turret type web unwinding device and a butt splicing device according to the present invention.

FIGS. 1 to 5 illustrate a preferred embodiment of the present invention.

Referring now to these figures, reference numeral 1 designates a conventional three-turret type unwinding device widely used, 2 an old or preceding web which has almost been unwound, 2' a cut waste of the preceding web which has been cut for discarding, 3 a new or succeeding web beginning to be unwound, 3' a cut waste of the succeeding web which has been cut for discarding, 4, 5 and 6 pass rolls rotatably mounted, 7 a cutting drum, 8 a cutting and splicing drum, 9 a splicing drum, 10 a frame to which the drums 7, 8 and 9 are rotatably attached, 11 a cutting member mounted on the cutting drum 7 to cut the web, 12 a cutting member mounted on the cutting and splicing drum 8 to cut the web in cooperation with the cutting member 11, 13 and 14 vent holes adapted to hold the cut waste 2' of the preceding web 2 on the cutting drum 7, and 15 and 16 vent holes to hold the leading end of the succeeding web 3 after cutting on the cutting and splicing drum 8, these vent holes functioning to securely transport the leading end of the succeeding web 3 after cutting into a splicing zone as the cutting and splicing drum 8 is rotated. Reference numeral 17 designates a vent hole to hold the leading end prior to cutting the succeeding web 3 on the cutting and splicing drum 8, 18 and 19 vent holes adapted to hold a splicing tape 23 on the splicing drum 9, and 20, 21 and 22 hollow shafts adapted to support the drums 7, 8 and 9 and serving as vent passages for reducing the pressure within the drums 7, 8 and 9, the hollow shafts being connected through rotary couplings to an externally located vacuum source (not shown). The splicing tape 23 is provided to splice the preceding web on the succeeding web in a butting fashion.

Operation of the device is as follows:

As can be seen in FIG. 1, the preceding web supported by the pass rolls 4 and 5 is travelled from the unwinding device 1 in a direction as indicated by the arrow passing through a passage between the cutting drum 7 and splicing drum 9 and the cutting and splicing drum 8 into the next processes such as a coating process and printing process.

Prior to initiation of the splicing operation, the leading end of the succeeding web 3 beginning to be unwound is drawn out of the unwinding device 1 onto the pass roll 6 so that the web can be held in position on the cutting and splicing drum 8. The cutting and splicing drum 8, which holds the leading end of the succeeding web 3, is internally reduced in pressure by the vacuum source (not shown) so that the leading end of the succeeding web 3 is attracted by the intake hole 17. On the other hand, the splicing tape 23 is held on a vent hole portion 18 with its adhesive surface directed outwardly, the vent hole 18 being formed in the surface of the splicing drum 9 which is reduced in pressure through the vent hole 19 of the hollow shaft 22 by the externally located vacuum source.

Figure 2:
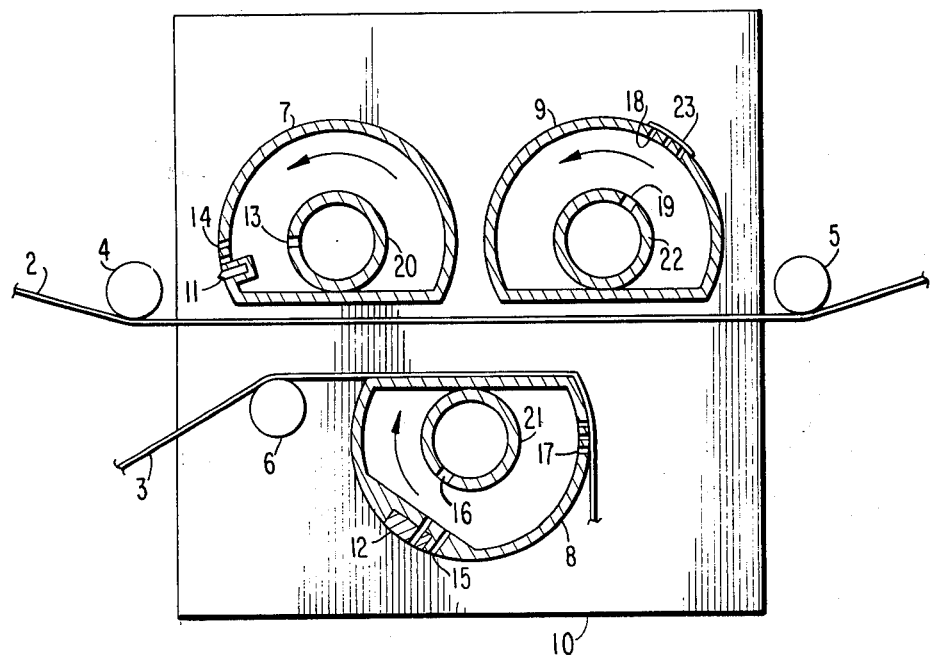
FIG. 2 is a schematic sectional view of the splicing device, the main parts of which being illustrated on an enlarged scale, showing a preferred embodiment of the present invention.

When necessary preparations as described above have been made and the trailing end of the preceding web 2 which has been unwound is disengaged from the core of the unwinding device 1, a power device (not shown) mounted on the frame 10 is started and drums 7, 8 and 9 can be rotated in a direction as indicated by the arrow in FIG. 2 by transmission means (not shown) such as gears, chains, etc. At this time, disengagement of the trailing end of the preceding web from the core can be automatically detected by measuring the tension of the preceding web 2, and also the trailing end of the preceding web 2 can be spliced by rotation of the drums immediately before the trailing end is disengaged from the core, by detecting the amount of the preceding web 2 remaining wound on the core.

Figure 3:
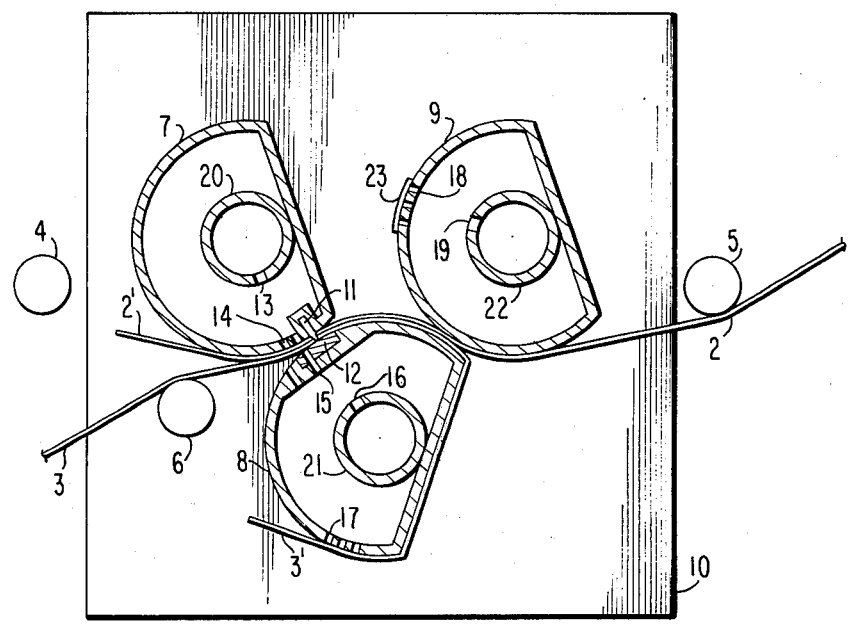
FIG. 3 is a schematic sectional view with the main parts illustrated on an enlarged scale, wherein drums in the device of FIG. 2 are rotated to illustrate the mode at the point when the web is cut.

When the drums 7, 8 and 9 are rotated to the positions at angles shown in FIG. 3, the preceding web 2 and the succeeding web 3 are gripped in an overlapping fashion between the cutting drum 7 and the cutting and splicing drum 8 and are then cut by the cutting members 11 and 12. That is to say, the cutting drum 7 cooperates with the cutting and splicing drum 8 to cut both webs 2 and 3. The succeeding and preceding webs 2, 3 are gripped by the drums 7, 8 and 9 and as a result these webs will not be drawn from the cutting area by the tension exerted on the succeeding and preceding webs 2, 3. Additionally, it is so designed that even if the cutting member 11 should come into contact with the preceding web 2 before the mode shown in FIG. 3 is formed, the preceding web 2 cannot be cut by the cutting member 11 by itself.

The cut waste 2' of the preceding web 2 is attracted by the vent hole 14 and held thereon, the vent hole being formed in the surface of the cutting drum 7 which is reduced in pressure through the vent hole 13 of the hollow shaft 20 by the externally located vacuum source (not shown). Similarly, the leading end of the succeeding web 3 after cutting is attracted by the vent hole 15 and held thereon, the vent hole being formed in the surface of the cutting and splicing drum 8 which is reduced in pressure through the vent hole 16 of the hollow shaft 21 by the externally located vacuum source (not shown).

Figure 4:
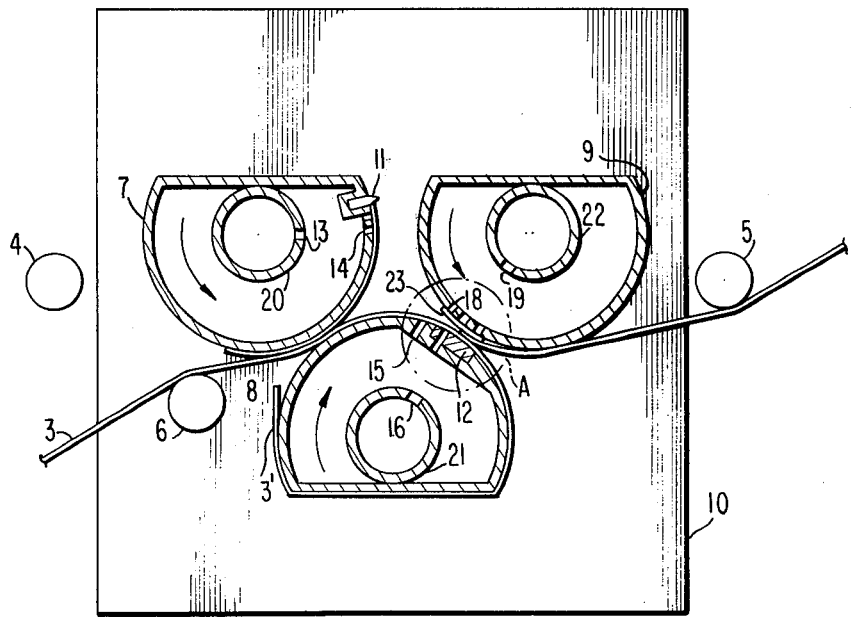
FIG. 4 is a schematic sectional view with the main parts illustrated on an enlarged scale, wherein the drums are further rotated from the positions in the mode shown in FIG. 3 to illustrate the mode at the point when the web is spliced.

When the drums 7, 8 and 9 are rotated to the positions at angles shown in FIG. 4 from the positions shown in FIG. 3, the leading end of the succeeding web 3 after being cut is attracted to the surface of the cutting and splicing drum 8 reduced in pressure and is securely travelled to the splicing zone A while being butted against the trailing end of the preceding web 2 after cutting. At this time, the cutting and splicing drum 8 cooperates with the splicing drum 9 to splice the trailing end of the preceding web 2 after cutting to the leading end of the succeeding web 3 after cutting in a butting fashion by the splicing tape 23 held on the surface of the splicing drum 9. In this case, if the splicing force of the splicing tape 23 is greater than the attraction of the splicing drum 9 by which the splicing tape 23 is attracted, the splicing tape 23 can easily be separated from the splicing drum 9. Where the splicing force is small, the attraction of the outside vacuum source for the splicing drum 9 can be stopped or decreased.

Since the cut waste 2' of the preceding web 2 is attracted by the vent hole 14 formed in the surface of the cutting drum 7 and held thereon, the cut waste is upwardly travelled together with the cutting drum 7 without being travelled to the splicing zone A together with the succeeding and preceding webs 2 and 3. Even when webs such as plastics, in which static electricity tends to be generated, are used, the cut waste 2' of the preceding web 2 is attracted by the cutting drum 7 and is upwardly travelled together with the cutting drum 7 without adhering to the succeeding web 3 and separating therefrom.

Figure 5:
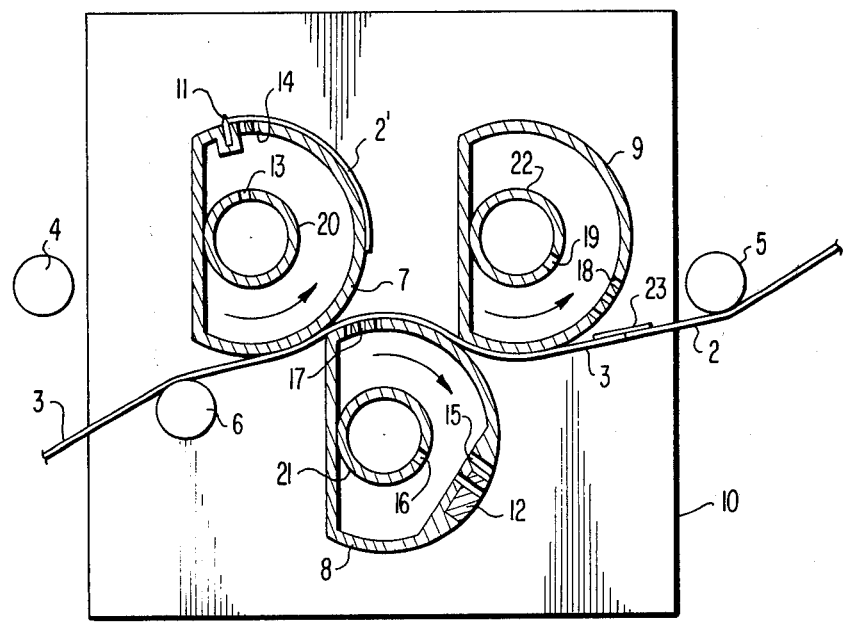
FIG. 5 is a schematic sectional view with the main parts illustrated on an enlarged scale, wherein the drums are further rotated from the positions in the mode shown in FIG. 4 to illustrate the mode where the web has been spliced.

When the drums 7, 8 and 9 are further rotated but have not reached the positions at angles shown in FIG. 5, the cut waste 3' of the succeeding web 3 held on the surface of the cutting and splicing drum 8 is removed by, for example, a removal means or a taking up means, or by use of a method such as applying pressure to the inside of the cutting and splicing drum 8.

When the drums 7, 8 and 9 are further rotated and stopped in the positions at the angles shown in FIG. 1, the splicing operation is completed. In order to remove the cut waste 2' of the preceding web 2 from the cutting drum 7, a manual operation or other removal means can be employed.

Figure 6:
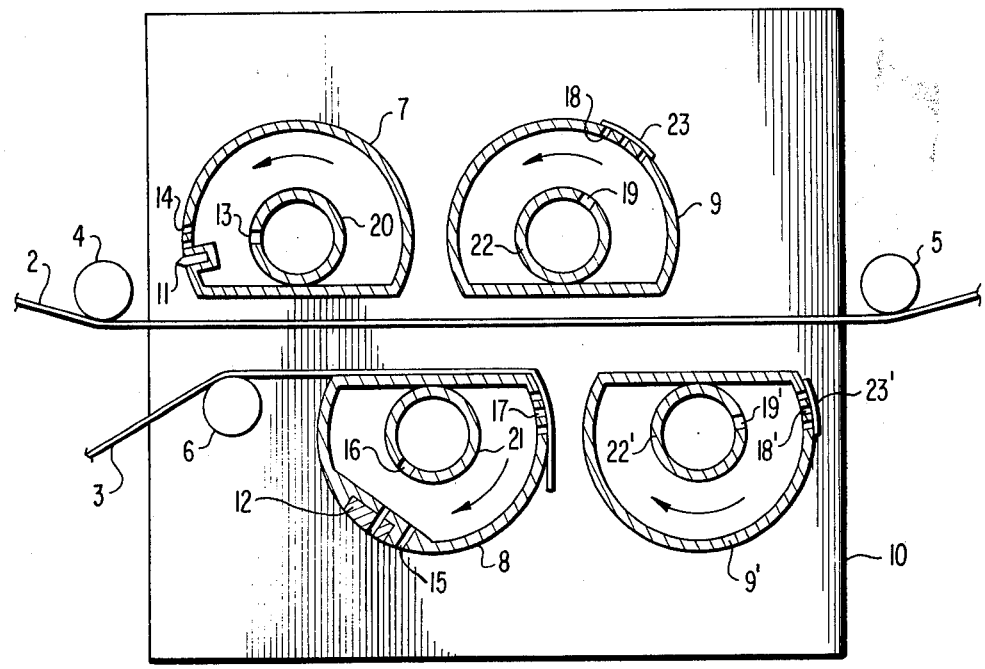
FIG. 6 is a schematic sectional view with the main parts illustrated on an enlarged scale, showing another embodiment of the present invention.
Figure 7:
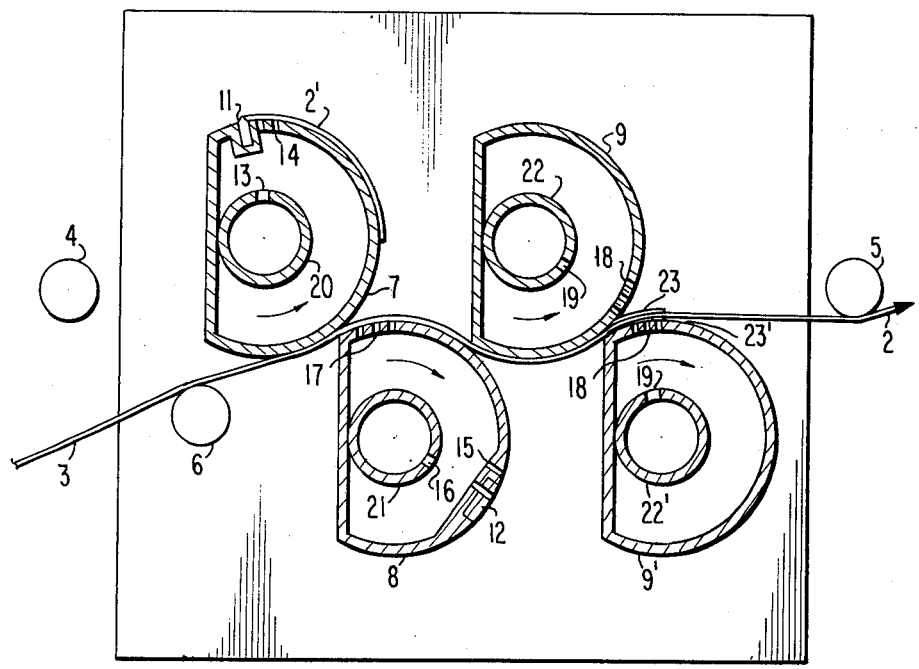
FIG. 7 is a schematic sectional view with the main parts illustrated on an enlarged scale, wherein the drums shown in FIG. 6 are rotated to illustrate the mode where splicing has been completed.
Figure 8:
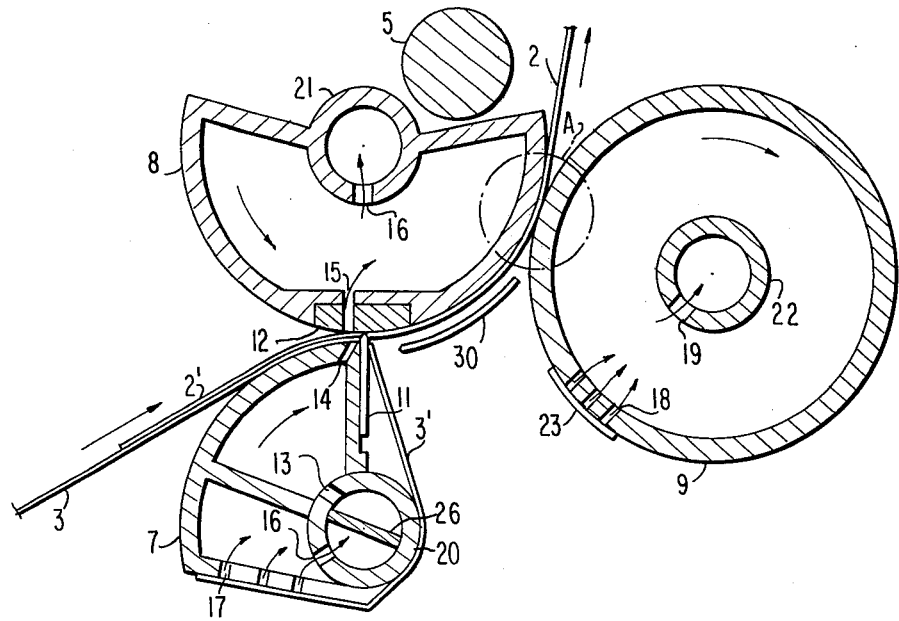
FIG. 8 is a schematic sectional view of a conventional web butt splicing device, the main parts of which are illustrated on an enlarged scale.

FIGS. 6 and 7 illustrate another form of an embodiment of the present invention.

In the arrangement shown in FIGS. 6 and 7, unlike the embodiment shown in FIGS. 1 to 5, splicing tapes are applied to both sides of a joint of the succeeding and preceding webs 2, 3. Referring now to FIGS. 6 and 7, a splicing drum 9' is provided to cooperate with the splicing drum 9 so as to affix a splicing tape 23' to a joint between the succeeding and preceding webs whereby the succeeding and preceding webs 2, 3 are spliced in abutting fashion. The arrangement shown therein comprises vent holes 18' and 19' adapted to hold the splicing tape 23' on the splicing drum 9', and a hollow shaft 22' mounted on the splicing drum 9'.

In this embodiment, the splicing tape 23 is affixed to one side of a joint between the succeeding and preceding webs 2, 3 in a manner similar to those described in connection with FIGS. 1 to 5. The joint between the succeeding and preceding webs 2, 3, one side of which is affixed with the splicing tape 23 by the cooperative operation of the cutting and splicing drum 8 and the splicing drum 9, is gripped between the splicing drums 9 and 9' by rotation of the drums 7, 8, 9 and 9'. In this case, it is so designed that the splicing tape 23' pre-attracted by the splicing drum 9' with its adhesive surface directed outwardly rotates and reaches the gripped portion so that the succeeding and preceding webs 2, 3 can be spliced from the side opposite to the splicing tape 23. The splicing tape 23' can be held on the splicing drum 9' in a manner similar to that of the splicing tape 23. FIG. 7 illustrates the mode wherein the splicing tape 23' is affixed by means of the splicing drums 9 and 9' and the drums 7, 8, 9 and 9' are slightly rotated. Thus, the method for affixing the splicing tape to both sides can be applied to cases where both sides of the web are coated with a coating liquid, where the web has a great tension, or where the splicing force of the splicing tape is not sufficient to obtain the required strength merely by affixing the splicing tape to one side.

In the embodiments as described above, preferably the surfaces of the splicing drums 9 and 9' are lined with a resilient material such as rubber.

It is to be understood that the present invention is not limited to the above described embodiments but that changes and variations can be made without departing from the scope of the claim.

For example, unlike those embodiments as shown in FIGS. 1 to 7, the web can be travelled in a vertical direction so as to be spliced; the succeeding and preceding webs can be arranged in the opposite way so that one web is located above the other, and vice versa; or the arrangement of drums and the travelling direction of web are not limited to those as described above.

Also, the cutting process is not limited to a pressing-cutting process as described in the above embodiments. For example, depending on the material of which the web is formed, the web can be cut by pressing the cutting member 11 directly on the surface of the cutting and splicing drum 8 without the provision of the cutting member 12, in which case, the surface of the cutting and splicing drum also serves as a cutting member. Moreover, another method can be employed in which instead of cutting the succeeding and preceding webs while they are overlapped, the leading end of the succeeding web 3 is held, by means of suction, in a position corresponding to the cutting portion of the surface of the cutting and splicing drum, and only the preceding web 2 is cut by means of the cutting members 11 and 12.

Additionally, while a method for holding a web or splicing tape has been described, in which the drum is internally reduced in pressure by the outside vacuum source so that the web or the like can be attracted by the vent holes 14, 15, 16, 17, 18 and 18' and held thereon, such a description is for illustrative purposes, and it is to be understood that the web or splicing tape can be held by affixing a double sided adhesive tape to the surfaces of drums.

Furthermore, in place of holding the succeeding web 3 on the vent hole 17, the leading end of the succeeding web 3 can be held on the taking up means, or the leading end of the succeeding web 3 can merely be passed on the cutting and splicing drum 8.

Where a web is used, for which the cut waste 2' of the preceding web 2 does not adhere to the succeeding web 3 due to the generation of static electricity or the like, the arrangement of the device is reversed to those shown in FIGS. 1 to 7 so as to eliminate the provision of a holding means for the cut waste 2', whereby the cut waste is allowed to drop by itself.

For splicing tapes 23 and 23', adhesive tapes are most commonly used, but pressure tapes may also be used. Other types of tapes can be used if they may attain the object as described.

The present invention possesses advantageous effects as follows:

1. Since the leading end of the succeeding web after cutting is held by a single cutting and splicing drum until splicing has been completed, the splicing operation can be performed in a complete butting condition without causing the leading end of the succeeding web after cutting to be displaced in the width direction or without a clearance occurring between the leading end of the succeeding web and the trailing end of the preceding web.

2. For the same reason as noted in the preceding paragraph, even webs, which are extremely thin in thickness and flexible in nature having a low rigidity, can easily be butt spliced in an advantageous manner.

3. For the same reason as described above, high speed splicing can be accomplished.

4. Because the cut waste of the preceding web is held by the cutting drum, webs such as plastics in which static electricity tends to be generated can be spliced in an advantageous manner securely separating the cut waste from the succeeding web.

While the invention has been described in detail and with reference to specific embodiments thereof, it will be apparent to one skilled in the art that various changes and modifications can be made therein without departing from the spirit and scope thereof.

What is claimed is:

1. In an apparatus for butt splicing of webs including a framework, a first cutting drum provided with a cutting member on the periphery thereof, a second cutting and splicing drum having a cutting member on its periphery cooperating with said cutting member of said first drum, and a third splicing drum including means for holding a piece of splicing tape thereon for movement therewith, the improvement comprising:

means for rotatably supporting said drums on said framework for rotation in synchronism with the second drum positioned intermediate of and closely adjacent to said first drum and said third drum, means for feeding the leading end of a new web and the trailing end of an old web along a path extending in the direction of feed between said second drum and said first drum and said second drum and said third drum, such that the leading end of the succeeding web and the trailing end of the preceding web are sandwiched between said first and second drums to simultaneously sever the same by said cooperating cutting members, and the abutting ends of the succeeding and preceding webs are subsequently sandwiched along with said piece of splicing tape between said second and third drums such that said splicing tape overlies said abutting web ends to splice the same, said first cutting drum including means on the periphery thereof trailing the cutting member carried by said first cutting drum for holding the trailing end of the preceding web to said first cutting drum after severance thereof, means on the periphery of the second drum leading said second drum cutting means for holding the leading end of said succeeding web on the periphery of said second and splicing drum, and for holding the leading end of the succeeding web after cutting, on the periphery of said second cutting and splicing drum to the position where the abutting ends of the preceding and succeeding webs are spliced by the piece of splicing tape at the splicing zone;

whereby, the cut portion of the trailing end of the preceding web is maintained in contact with the periphery of the first cutting drum and the cut portion of the leading end of the succeeding web is maintained on the periphery of the second cutting and splicing drum.

2. The apparatus as claimed in claim 1, wherein said means for holding the various portions of said preceding and succeeding webs to the peripheries of said first, second and third drums comprise holes within said drums and means for supplying vacuum pressure to said holes during rotation of said drums.

* * * * *